US012731167B2

(12) United States Patent
Gamble et al.

(10) Patent No.: US 12,731,167 B2
(45) Date of Patent: Sep. 8, 2026

(54) SYSTEMS AND METHODS FOR IMPROVING NETWORK PERFORMANCE USING QUANTUM ANNEALING

(71) Applicant: Verizon Patent and Licensing Inc., Basking Ridge, NJ (US)

(72) Inventors: Jerry Gamble, Grapevine, TX (US); Richard N. Watson, Boonton, NJ (US); William F. Copeland, Garland, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 130 days.

(21) Appl. No.: 18/301,026

(22) Filed: Apr. 14, 2023

(65) Prior Publication Data

US 2024/0346543 A1 Oct. 17, 2024

(51) Int. Cl.
*G06Q 30/0226* (2023.01)
*G06F 17/18* (2006.01)

(52) U.S. Cl.
CPC ......... *G06Q 30/0226* (2013.01); *G06F 17/18* (2013.01)

(58) Field of Classification Search
CPC ............................ G06Q 30/0226; G06F 17/18
See application file for complete search history.

(56) References Cited

U.S. PATENT DOCUMENTS

2014/0094159 A1* 4/2014 Raleigh ................. H04W 24/02 455/418
2021/0255856 A1* 8/2021 Cao ........................ G06N 10/00
2021/0256351 A1* 8/2021 Cao ........................ G06N 3/047
2021/0390159 A1* 12/2021 De Carvalho, Jr. . G06Q 10/047
2022/0222042 A1* 7/2022 Yamaguchi .............. G06N 5/01
2022/0391742 A1* 12/2022 Amaro ................... G06N 10/80
2023/0094389 A1* 3/2023 You .......................... G06N 5/01 706/62

OTHER PUBLICATIONS

Rebentrost, Patrick; Quantum Computational Finance: quantum algorithm for portfolio optimization; Nov. 9, 2018; Cornell University.*
Quentin Grafton; Increase in Risk and its Effects on Welfare and Optimal Policies in a Dynamic Setting: The Case of Global Pollution; Jun. 24, 2014; The Geneva Risk and Insurance Review.*
Xie; Price Competition and Compatibility in the Presence of Positive Demand Externalities; May 1995; Management Science.*
Mugel S. et al.: Dynamic portfolio optimization with real datasets using quantum processors and quantum-inspired tensor networks. Phys. Rev. Research 4, 013006—Published Jan. 3, 2022, 13 pages.
Mugel S.: Multiverse Computing: Optimizing Financial Portfolios with Quantum Computing. 2021 D-Wave Systems Inc., 3 pages.

* cited by examiner

*Primary Examiner* — Arthur Duran

(57) ABSTRACT

A device may include a processor configured to select a plurality of customers; select a plurality of network assets; and generate a Hamiltonian function representation of optimizing the plurality of network assets with respect to the plurality of customers. The processor may be further configured to determine a global minimum for the Hamiltonian function representation using a quantum annealer; select a distribution of the plurality of network assets based on the determined global minimum of the Hamiltonian function representation; and apply the selected distribution of the plurality of network assets to improve network performance.

20 Claims, 8 Drawing Sheets

SYSTEMS AND METHODS FOR IMPROVING NETWORK PERFORMANCE USING QUANTUM ANNEALING

BACKGROUND INFORMATION

To satisfy the needs and demands of users of mobile communication devices, providers of wireless communication services continue to improve and expand available services and networks used to deliver such services. Such improvements include the management of a large number of different network assets. A prediction system, such as a machine learning system, may be used to determine an efficient distribution of network assets. However, such a prediction system may not be able to efficiently determine an optimum distribution of network assets for a sufficiently large number of network assets.

DETAILED DESCRIPTION OF EXAMPLE EMBODIMENTS

Figure 1:
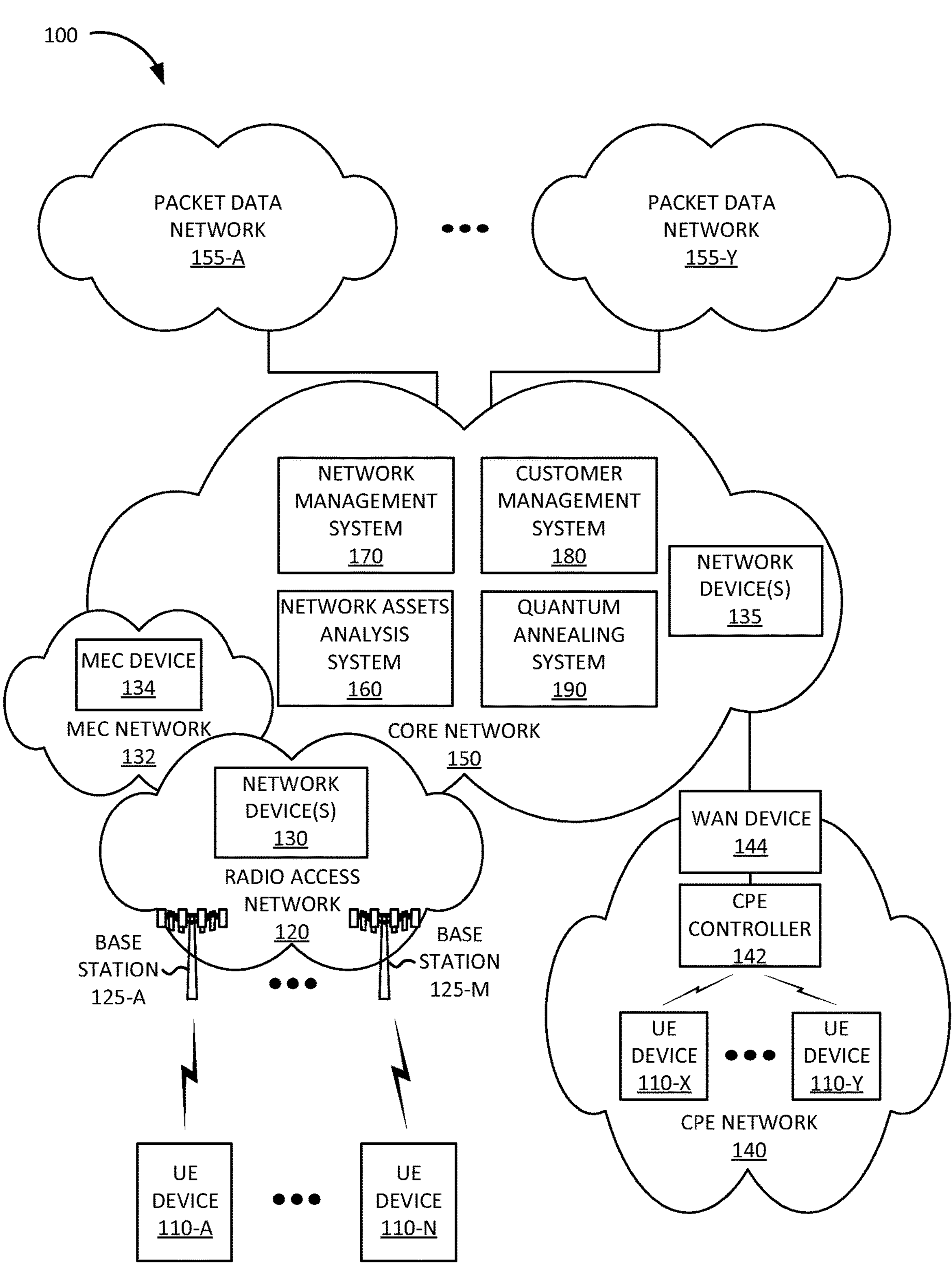
FIG. 1 illustrates an environment according to an implementation described herein.

The following detailed description refers to the accompanying drawings. The same reference numbers in different drawings identify the same or similar elements.

A provider of wireless communication services may manage a large number of network assets. The network assets may include devices, links, applications, and/or services associated with wireless network infrastructure, such as, for example, base stations, switches, routers, firewalls, application servers, physical infrastructure for virtual network functions (VNFs), Multi-access Edge Computing (MEC) devices, optical terminals, reconfigurable optical add/drop multiplexers (ROADMs) and/or other components of an optical network, VNFs, applications and/or microservices deployed in a cloud center and/or MEC network, and/or other types of hardware or software components and/or resources associated with a Radio Access Network (RAN), core network, MEC network, and/or another type of network managed by a provider. Furthermore, the network assets may include devices, links, applications, and/or services provided to, and/or managed for, a customer of the provider, such as, for example, user equipment (UE) devices, fixed wireless access (FWA) devices, customer premises controller (CPE) devices such as WiFi Access Point (AP) devices, applications, microservices, and/or other types of hardware or software components and/or resources provided to, and/or managed for, a customer.

Network assets managed by a provider may require maintenance, upgrades, repair, and/or replacement. Management of a large number network assets may therefore be expensive and require large amounts of resources. Therefore, maintenance, upgrades, repair, and/or replacement of network assets may need to be made efficiently. One way to optimize the benefits of managing a large number of network assets may be to offer maintenance, upgrades, repair, and/or replacement of particular network assets in an inducement bundle for a particular customer. An inducement bundle for a customer may include an offer to provide one or more network assets to the customer if a customer remains with the provider, or if a customer becomes a new customer of the provider. For example, an inducement bundle may include one or more of an offer of a new smart phone to the customer, an upgrade for an application to a new Quality of Service (QOS) class, an additional data line, deployment of another base station in a geographic area to improve coverage, increasing capacity for an existing base station, deploying a microservice at a MEC location to reduce latency for an application, and/or offers associated with other types of network assets. The number of possible network assets that may be selected for an inducement bundle may be very large. Furthermore, cost constraints may limit the number of network assets that may be included in inducement bundles for customers. Moreover, different customers may respond to different inducement bundles.

By treating inducements as "assets," cost constraints as a "total investment," and customer response as a "rate of return," inducement bundles may be treated as a "portfolio" and optimized to ensure the best performance of inducement bundles. While classical approaches may be used to optimize portfolios, such approaches may not be practical for a large number of variables, as calculating a solution may either take a long time or may not be achievable at all using classical computers.

However, a quantum annealing process may be able to calculate such a solution in a practical amount of time. A quantum annealer may use a quantum annealing process to find a global minimum for a function over a set of candidate solutions using quantum fluctuations. Quantum annealing is related to the classical optimization process known as simulated annealing. Simulated annealing imitates the process of annealing a metal sample by heating and cooling the metal sample in a controlled manner to reduce the thermodynamic free energy of the metal sample to improve its physical properties, using an annealing temperature parameter that is gradually reduced in each step until reaching zero in the final step.

In quantum annealing, the temperature parameter is replaced with a quantum tunneling parameter. As the iterations of quantum annealing proceed, the strength of the transverse tunneling field is changed over time. The quantum tunneling process starts with a superposition of all possible quantum states of the system and evolves based on the time-dependent Schrodinger equation. In each step, the amplitudes of the candidate state change based on the strength of the transverse field, resulting in quantum tunneling between the states. The energy state of the system is represented as a Hamiltonian, that is, as the sum of the kinetic and potential energy of the system, and the solution of the Hamiltonian corresponds to the ground state of the system.

Thus, using a quantum annealing process on a Hamiltonian representation of a system generates a global minimum solution of the energy of the system. For a Hamiltonian representation of inducement bundles of network assets, the solution corresponds to the optimum distribution of network assets that maximizes the "return on investment" based on the provided cost constraints. A quantum annealer may include a special purpose integrated circuit configured to solve quantum annealing problems. A quantum annealer may be based on, for example, a superconducting adiabatic quantum optimization processor.

Implementations described herein relate to systems and methods to improve network performance using quantum annealing. A computer device may be configured to determine a distribution of network assets to be included in inducement bundles for customers using quantum annealing. Each inducement bundle may include a list of one or more network assets offered to the customer if the customer starts a subscription, continues a subscription, and/or upgrades a subscription for communication services from the provider. A "network asset," as the term is used herein, may refer to a physical or virtualized network device, a consumer device such as a UE device (e.g., a smart phone, etc.); an application, microservice, or another type of software asset; a communication link; a wireless or wired communication service; and/or another type of network asset, along with an offer to provide and/or make the network asset available to a customer, and/or an offer to deploy, maintain, upgrade, repair, replace and/or otherwise service the network asset.

The computer device may be configured to select a set of customers and a set of network assets and generate a Hamiltonian function representation of optimizing the set of network assets with respect to the set of customers. Generating the Hamiltonian function representation may include selecting a set of time events during a time period associated with the set of network assets and generating a set of vectors for a distribution of the set of network assets based on the set of time events.

Generating the Hamiltonian function representation may further include generating an expected returns vector based on historical performance of the network assets and using the generated expected returns vector as a parameter in the Hamiltonian function representation. Generating the Hamiltonian function representation may further include determining a cost of investment for the network assets and using the determined cost of investment as a constant in the Hamiltonian function representation. Generating the Hamiltonian function representation may further include determining a risk aversion factor for the set of customers and using the determined risk aversion factors as a constant in the Hamiltonian function representation. For example, the risk aversion factor may include an inverse of an estimated value of acquiring a new customer and/or an estimated risk of losing an existing customer.

The computer device may be further configured to determine a global minimum for the Hamiltonian function representation using a quantum annealer by solving a Hamiltonian function corresponding to the Hamiltonian function representation to determine values for the set of vectors for the distribution of the network assets. The computer device may be configured to select a distribution of the network assets over the set of time events based on the determined global minimum of the Hamiltonian function representation and apply the selected distribution of network assets to improve network performance.

In some implementations, the distribution of network assets may correspond to inducement bundles for products or services for the set of customers. For example, an inducement bundle may include one or more of installing a new network device, upgrading an existing network device, adding capacity to a network device or a network link, adding functionality to a network device, improving service coverage in a particular geographic area, and/or other types of network assets or actions/services associated with network assets. The network device may include, for example, a base station, a fixed wireless access device, an optical terminal, a WiFi access point, a router, a MEC device, and/or another type of network device.

FIG. 1 is a diagram of an exemplary environment 100 in which the systems and/or methods described herein may be implemented. As shown in FIG. 1, environment 100 may include UE devices 110-A to 110-N and 110-X to 110-Y (referred to herein collectively as "UE devices 110" and individually as "UE device 110"), base stations 125-A to 125-M (referred to herein collectively as "base stations 125" and individually as "base station 125") in RAN 120, a MEC network 132, a Customer Premises Equipment (CPE) network 140, a core network 150, and packet data networks (PDNs) 155-A to 155-Y (referred to herein collectively as "PDNs 155" and individually as "PDN 155").

UE device 110 may include any device with cellular and/or WiFi wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV™, Google Chromecast™, Amazon Fire TV™, etc.), a WiFi access point (AP), a smart television, a fixed wireless access device, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for Internet of Things (IoT) applications.

RAN 120 may include base stations 125. Base station 125 may enable UE device 110 to communicate with core network 150. Base station 125 may be configured for one or more Radio Access Technology (RAT) types. For example, base station 125 may include a Fifth Generation (5G) New Radio (NR) base station (e.g., a gNodeB) and/or a Fourth Generation (4G) Long Term Evolution (LTE) base station (e.g., an eNodeB). Each base station 125 may include devices and/or components to enable cellular wireless communication with UE devices 110. For example, base station 125 may cover a set of base station cells, also referred to as base station sectors. That is, each cell may cover a sector (e.g., a 120° sector, etc.). Base station 125 may include a radio frequency (RF) transceiver configured to send and receive wireless signals in the direction of the sector and be configured to communicate with UE devices 110 using a 5G NR air interface, a 4G LTE air interface, and/or using another type of cellular air interface. Furthermore, base station 125 may include one or more edge computing devices configured to perform cloud computing for UE devices 110 serviced by base station 125.

RAN 120 may include one or more network devices 130 (referred to herein collectively as "network devices 130" and individually as "network devices 130"). Network device 130 may include a transport network device that provides connectivity from base station 125 to core network 150. Network device 130 may include, for example, a switch, router, firewall, gateway, an optical switching device (e.g., a reconfigurable optical add-drop multiplexer, etc.), and/or another type of network device.

MEC network 132 may be associated with one or more base stations 125 and may provide MEC services for UE devices 110 attached to the base stations 125. MEC network 132 may be in proximity to base stations 125 from a geographic and network topology perspective, thus enabling low latency communication with UE devices 110 and/or base stations 125. For example, MEC network 132 may be located on a same site as one of the one or more base stations 125, and/or be geographically closer to the one or more base stations 125, and reachable via fewer network hops and/or fewer switches, than other base stations 125. As another example, MEC network 132 may be reached without having to go through a gateway device, such as a 4G Packet Data Network Gateway (PGW) or a 5G User Plane Function (UPF). MEC network 132 may include one or more MEC devices 134. MEC devices 134 may provide MEC services to UE devices 110, such as, for example, hosting a microservice for an application, providing content delivery of streaming audio and/or video, cloud computing services, gaming, authentication services, etc.

CPE network 140 may include a local area network (LAN) associated with a customer's premises. CPE network 140 may be located at or within a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 140 may include UE devices 110-X to 110-Y, a CPE controller 142, and a wide area network (WAN) device 144. CPE network 140 may be managed, at least in part, by a provider of communication services, such as a provider managing RAN 120 and/or core network 150. For example, the provider may enable CPE network 140 to connect to core network 150 via a managed network device, such as WAN device 144 and/or CPE controller 142. CPE network 140 may receive one or more services via a wireless connection between a WAN device 144 and core network 150, such as, for example, a television service, Internet service, and/or voice communication (e.g., telephone) service. For example, CPE network 140 may be implemented as a gigabit network that enables gigabit speed connections.

WAN device 144 may interface CPE network 140 to a WAN, such as core network 150, via a wired and/or wireless connection. As an example, WAN device 144 may include an optical network terminal (ONT). An ONT may connect to core network 150 via an optical fiber and may function as a gateway device to Gigabit Passive Optical Network (GPON) or a GPON2 located in core network 150. As another example, WAN device 144 may connect to core network 150 via a wired electrical connection, such as a coaxial cable. As yet another example, WAN device 144 may include a fixed wireless access (FWA) device configured to communicate with core network 150 via a RAN 120.

CPE controller 142 may include a network device, such as a switch, router, firewall, and/or gateway and may support different types of interfaces, such as an Ethernet interface, a WiFi interface, a Multimedia over Coaxial Alliance (MoCa) interface, and/or other types of interfaces. CPE controller 142 may additionally function as a WiFi AP. CPE controller 142 may include a transceiver configured to communicate with UE devices 110 using WiFi signals based on the Institute of Electrical and Electronics Engineers (IEEE) 802.11 standards for implementing a wireless LAN network. UE devices 110-X to 110-Y may communicate with CPE controller 142 using WiFi signals.

Core network 150 may be managed by a provider of cellular wireless communication services and may manage communication sessions of subscribers (e.g., UE devices 110) connecting to core network 150 via RAN 120 and/or CPE network 140. For example, core network 150 may establish an Internet Protocol (IP) connection between UE devices 110 and PDN 155. In some implementations, core network 150 may include a 5G core network. In other implementations, core network 150 may include a 4G core network (e.g., an evolved packet core (EPC) network).

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a Virtual Network Function (VNF) virtual machine, a CNF container, an event driven serverless architecture interface, and/or another type of SDN component. The common shared physical infrastructure may be implemented using one or more devices 200 described below with reference to FIG. 2 in a cloud computing center associated with core network 150. Core network 150 may include network devices 135, a network assets analysis system 160, a network management system 170, a customer management system 180, and a quantum annealing system 190. Network device 135 may provide connectivity within core network 150. Network device 135 may include, for example, a switch, router, firewall, gateway, an optical switching device (e.g., a reconfigurable optical add-drop multiplexer, etc.), and/or another type of network device.

Network assets analysis system 160 may include one or more computer devices, such as server devices and/or cloud computing devices, configured to determine a distribution of network assets to be included in inducement bundles for customers using quantum annealing. Network assets analysis system 160 may obtain network assets information from network management system 170 and/or customer management system 180 and may obtain customer information from customer management system 180. Network assets analysis system 160 may generate a Hamiltonian function representation of optimizing a set of network assets with respect to a set of customers, provide the generated Hamiltonian function representation to quantum annealing system 190, and obtain a solution for the generated Hamiltonian function representation from quantum annealing system 190. The obtained solution may include a distribution of the set of network assets based on the set of time events. The distribution of the network assets may identify which network assets, of the set of network assets, should be included in an inducement bundle for a customer for each customer in the set of customers. Network assets analysis system 160 may select network assets to be included in inducement bundles for the customers and may send information identifying the selected network assets to network management system 170 and/or customer management system 180.

Network management system 170 may include one or more computer devices, such as server devices and/or cloud computing devices, configured to manage network devices and/or network connections in RAN 120, MEC network 132, CPE network 140, and/or core network 150. Network management system 170 may provide information relating to network assets associated with RAN 120, MEC network 132, CPE network 140, and/or core network 150 to network assets analysis system 160. Furthermore, network management system 170 may receive information from network assets analysis system 160 relating to particular network assets that should be deployed, maintained, upgraded, repaired, replaced and/or otherwise serviced. Network management system 170 may perform a management action and/or generate a service ticket document for a network docket based on the information received from network assets analysis system 160.

Customer management system 180 may include one or more computer devices, such as server devices and/or cloud computing devices, configured to manage customers of the provider of communication services that manages RAN 120, MEC network 132, CPE network 140, and/or core network 150. Customer management system 180 may provide information relating to the customers to network assets analysis system 160. Furthermore, customer management system 180 may receive information from network assets analysis system 160 relating to particular network assets that are to be included in an inducement bundle for the customer. The inducement bundle may identify network assets associated with RAN 120, MEC network 132, CPE network 140, and/or core network 150, a make and model of UE device 110 (e.g., a smart phone) offered to the customer, services and/or application installed on UE device 110, etc.

Quantum annealing system 190 may include one or more computer devices, such as server devices and/or cloud computing devices, configured to perform a quantum annealing process to solve for a global minimum of a Hamiltonian function. For example, quantum annealing system 190 may include a superconducting adiabatic quantum optimization processor (e.g., based on Josephson junctions, etc.), a trapped ion quantum computer, a quantum dot computer, a nuclear magnetic resonance quantum computer, an optical lattice quantum computer, and/or another type of quantum annealing processor.

PDNs 155-A to 155-Y may each include a PDN connected to core network 150. A particular PDN 155 may be associated with a Data Network Name (DNN) in 5G, and/or an Access Point Name (APN) in 4G, and UE device 110 may request a connection to PDN 155 using the DNN or APN. PDN 155 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a Code-Division Multiple Access (CDMA) network, a general packet radio service (GPRS) network, etc.), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
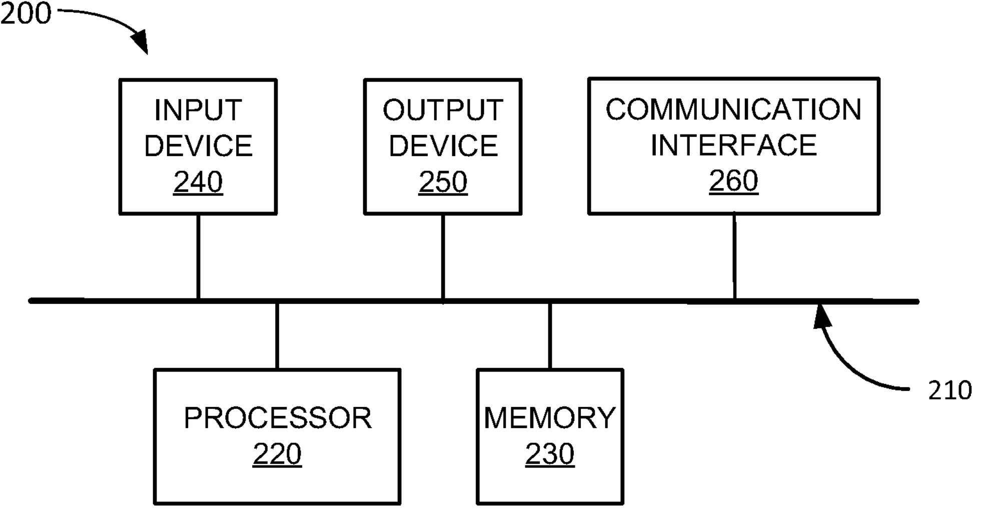
FIG. 2 illustrates exemplary components of a device that may be included in a component of an environment according to an implementation described herein.

FIG. 2 illustrates example components of a device 200 according to an implementation described herein. UE device 110, base station 125, network device 130, MEC device 134, network device 135, CPE controller 142, WAN device 144, network assets analysis system 160, network management system 170, customer management system 180, and/or quantum annealing system 190 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, in an implementation, device 200 may perform certain operations relating to generating a Hamiltonian function representation of optimizing a distribution of network assets with respect to a set of customers and solving the Hamiltonian function representation using quantum annealing. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
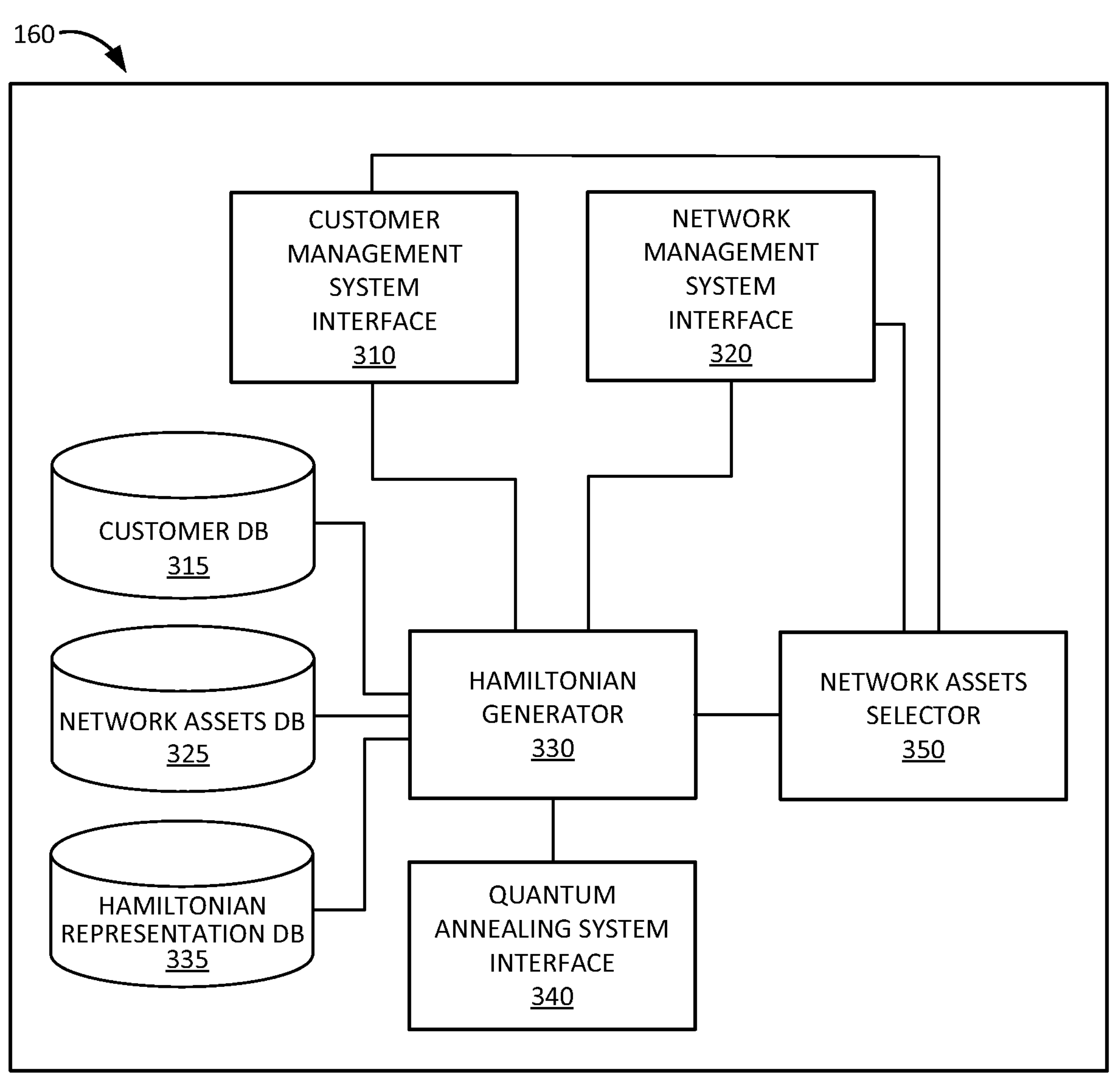
FIG. 3 illustrates exemplary components of a network assets analysis system according to an implementation described herein.

FIG. 3 is a diagram illustrating exemplary components of network assets analysis system 160. The components of network assets analysis system 160 may be implemented, for example, via processor 220 executing instructions from memory 230. Alternatively, some or all of the components of network assets analysis system 160 may be implemented via hard-wired circuitry. As shown in FIG. 3, network assets analysis system 160 may include a customer management system interface 310, a customer database (DB) 315, a network management system interface 320, a network assets DB 325, a Hamiltonian generator 330, a Hamiltonian representation DB 335, a quantum annealing system interface 340, and a network assets selector 350.

Customer management system interface 310 may be configured to communicate with customer management system 180. For example, customer management system interface 310 may receive, from customer management system 180, information relating to customers of the provider of communication services that manages RAN 120, MEC network 132, CPE network 140, and/or core network 150 and store the received information in customer DB 315. Furthermore, customer management system interface 310 may provide to customer management system 180 information relating to particular network assets that are to be included in an inducement bundle for the customer.

Network management system interface 320 may be configured to communicate with network management system 170. For example, network management system interface 320 may receive information relating to network assets associated with RAN 120, MEC network 132, CPE network 140, and/or core network 150 from network management system 170 and store the received information in network assets DB 325. Furthermore, network management system interface 320 may provide information to network assets analysis system 160 relating to particular network assets that should be deployed, maintained, upgraded, repaired, replaced and/or otherwise serviced, based on a network asset distribution selected by network assets selector 350.

Hamiltonian generator 330 may generate a Hamiltonian function representation of optimizing a set of network assets with respect to the set of customers using information stored in customer DB 315 and network assets DB 325. The Hamiltonian function representation may be based on the following equation:

$$H=\sum_{t=t_i}^{t_f}-\rho_t^T*\omega_t+\left(\frac{a}{2}\right)*\omega_t^T*\sum_t\omega_t+b*(\Delta\omega_t)^2+c*\left(u^T*\omega_t-1\right)^2 \quad \text{Eq. (1)}$$

In Equation (1), H represents the value of the Hamiltonian corresponding to the total free energy of the system. The variable t represents a series of time events during a time period from an initial time event $t_i$ to a final time event $t_f$. The time events may correspond to sale opportunities to retain an existing customer or to acquire a new customer using an inducement bundle and may correspond to, for example, individual billing cycle periods, time periods at which new inducement bundles or promotions are provided to customers, and/or other types of time periods.

The vector $\rho_t$ may correspond to a vector of length N and may represent the expected "return" of individual network assets at time t. Each element of vector $\rho_i$ may represent a network asset with respect to a customer. Thus, for a set of i network assets and j customers, vector $\rho_t$ may include i*j=N elements. The elements of vector $\rho_t$ may correspond to Boolean values, with a value of 0 if a customer did not respond to an inducement bundle that included a particular network asset and a value of −1 if the customer did respond to an inducement bundle that included a particular network asset. The value for a successful response is negative because quantum annealing seeks to minimize the Hamiltonian, and thus a maximization problem is treated as minimizing a negative value.

The vector $\omega_t$ may correspond to a vector of length N representing the weight associated with each network asset with respect to each customer at time t. Thus, a series of $\omega_t$ vectors may represent a distribution of the set of network assets with respect to the set of customers at each time event t in the series of time events from $t_i$ to $t_f$. Each element of vector $\omega_t$ may represent a network asset with respect to a customer. Thus, for a set of i network assets and j customers, vector $\omega_t$ may include i*j=N elements. Quantum annealing system 190 may solve Equation (1) for the series of $\omega_t$ vectors. The elements of vector $\omega_t$ may correspond to Boolean values. For example, after Equation (1) is solved, if a network asset is to be included in an inducement bundle for a customer during a time period corresponding to t, the index of vector $\omega_t$ corresponding to the network asset in connection with the customer may include a value of 1, and if the network asset is not to be included in the inducement bundle for the customer during the time period corresponding to t, the index of vector $\omega_t$ corresponding to the network asset in connection with the customer may include a value of 0.

The constant a in Equation (1) represents a "risk aversion" factor with respect to particular customers. As an example, for new customers, the risk aversion factor may be based on an inverse of an estimated value of acquiring a customer. As another example, for existing customers, the risk aversion factor may be based on an estimated risk of losing a customer. The constant b in Equation (1), which is multiplied by the change squared of the weight from one time increment to the next, corresponds to the cost of investment at each time step. The constant c in Equation (1) imposes a constraint that all normalized weights for the network asset distribution add up to 1 when multiplied by the constant c, wherein the vector u corresponds to an N-dimensional vector in which each element has a value of 1.

Hamiltonian generator 330 may prepare the energy function for a system H using Equation (1), representing the function to be optimized. Hamiltonian generator 330 may select a set of time intervals from $t_i$ to $t_f$, generate vectors $\omega_t$ representing a series of network asset distributions over time, generate vectors $\rho_t$ representing the expected return during each time interval, and select constants a, b, and c for Equation (1). Additional constraints may be applied by adding a penalty function to the Hamiltonian function. Thus, a distribution of network assets for an inducement bundle may be represented as a portfolio optimization problem. Hamiltonian generator 330 may store the generated Hamiltonian function representation in Hamiltonian representation DB 335. Exemplary information that may be stored in Hamiltonian representation DB 335 is described below with reference to FIG. 4.

Hamiltonian generator 330 may provide the energy function based on Equation (1) to quantum annealing system interface 340. Quantum annealing system interface 340 may provide the energy function to quantum annealing system 190. Quantum annealing system 190 may determine a global minimum for the Hamiltonian function representation by solving the Hamiltonian function for values of the $\omega_t$ vectors corresponding to the global minimum value for H. Quantum annealing system 190 may determine the global minimum by initializing the system at a ground state and allowing successive adiabatic annealing cycles to slowly guide the system into the desired solution state.

Network assets selector 350 may select a distribution of network assets for a particular time period based on information obtained from Hamiltonian generator 330. For example, Hamiltonian generator 330 may obtain a solution to a Hamiltonian function representation from quantum annealing system 190, which includes a set of the $\omega_t$ vectors with values in each vector $\omega_t$ representing whether a particular network asset should be included in an inducement bundle for a customer during time t. Network assets selector 350 may determine, for each network asset, whether the network asset should be included in an inducement bundle and which customers should be offered an inducement bundle with the network asset. Network assets selector 350 may provide the customer inducement bundle information to customer management system interface 310 to provide to customer management system 180. Furthermore, network assets selector 350 may generate a list of network assets that are to be offered to customers and provide the list to network management system interface 320 to provide to network management system 180. Network management system 180 may generate service tickets for the network assets and the service tickets may be activated if a customer, or at least a threshold number of customers, respond to an inducement bundle.

Although FIG. 3 shows exemplary components of network assets analysis system 160, in other implementations, network assets analysis system 160 may include fewer components, different components, additional components, or differently arranged components than depicted in FIG. 3. Additionally, or alternatively, one or more components of network assets analysis system 160 may perform one or more tasks described as being performed by one or more other components of network assets analysis system 160.

Figure 4:
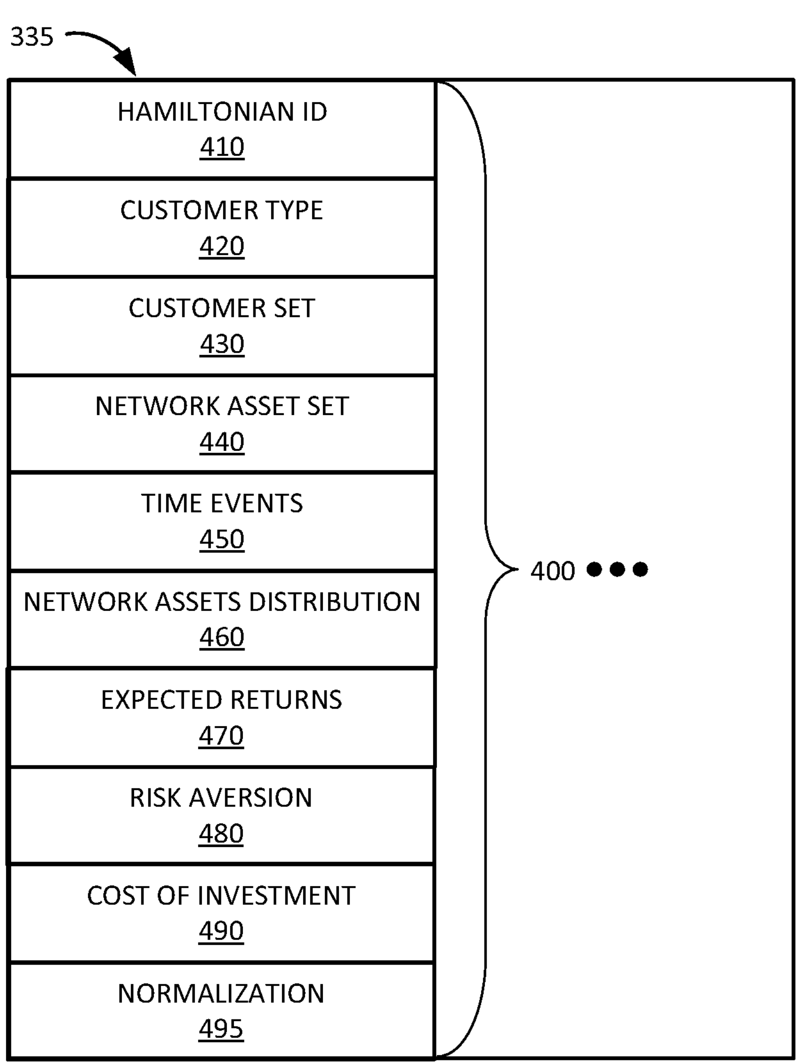
FIG. 4 illustrates exemplary components of a Hamiltonian representation database according to an implementation described herein.

FIG. 4 illustrates exemplary components of Hamiltonian representation DB 335. As shown in FIG. 4, Hamiltonian representation DB 335 may include one or more Hamiltonian representation records 400. Each Hamiltonian representation record 400 may store information relating to a particular Hamiltonian representation for a set of network assets with respect to a set of customers. As an example, a first Hamiltonian function representation may be generated for new customers, and a second Hamiltonian function representation may be generated for existing customers. As another example, in some implementations, different Hamiltonian representation records 400 may be generated for different types of customers, such as a first Hamiltonian function representation for mobile wireless customers, a second Hamiltonian function representation for FWA customers, a third Hamiltonian function representation for customers serviced via an ONT, etc. As yet another example, different Hamiltonian function representations may be generated for customers in different geographic areas (e.g., different countries, different cities, etc.), for customers associated with different account types of subscriptions (e.g., business customers, consumer customers, government agency customers, etc.), for customers assigned different priorities, etc.

Furthermore, in some implementations, different Hamiltonian function representations may be generated for different sets of network assets for the same set of customers. For example, a first Hamiltonian function representation may be generated for UE devices, a second Hamiltonian function representation may be generated for network devices, a third Hamiltonian function representation may be generated for applications installed on UE devices, a fourth Hamiltonian function representation may be generated for microservices deployed on MEC devices 134, a fifth Hamiltonian function representation may be generated for applications available via CPE controller 142, a sixth Hamiltonian function representation may be generated for different types of discounts offered to customers, etc.

Hamiltonian representation record 400 may include a Hamiltonian representation identifier (ID) field 410, a customer type field 420, a customer set field 430, a network asset set field 440, a time events field 450, a network assets distribution field 460, an expected returns field 470, a risk aversion field 480, a cost of investment field 490, and a normalization field 495.

Hamiltonian representation ID field 410 may store an ID associated with a Hamiltonian function representation. Customer type field 420 may identify a customer type associated with the Hamiltonian function representation. Customer set field 430 may store information identifying a set of customers associated with the Hamiltonian function representation. For example, customer set field 430 may include, for each customer in the set of customers, a subscriber ID associated with the customer subscription, an ID associated with the customer's UE device 110 (e.g., a Mobile Directory Number (MDN), an International Mobile Subscriber Identity (IMSI), a Mobile Station International Subscriber Directory Number (MSISDN), an International Mobile Equipment Identity (IMEI), etc.) and/or another type of customer identifier. Furthermore, each customer may be assigned to an index that associates the customer with an index in the $\omega_t$ vectors of the Hamiltonian function representation.

Network asset set field 440 may store information identifying a set of network assets associated with the Hamiltonian function representation. For example, network asset set field 440 may include, for each network asset in the set of network assets, a description identifying the network asset, an ID associated with the network asset (e.g., device ID, application ID, etc.), and/or other types of information associated with the network asset. Furthermore, each network asset may be assigned to an index that associates the network asset with an index in the $\omega_t$ vectors of the Hamiltonian function representation.

Time events field 450 may store information identifying a set of time events corresponding indices $t_i$ to $t_f$ in the Hamiltonian function representation. Network assets distribution field 460 may store a distribution of network assets over the time events. For example, network assets distribution field 460 may first store vectors $\omega_t$ with the initial values. Once the Hamiltonian function representation is solved by quantum annealing system 190, vectors $\omega_t$ may store, at each index, a value of 1, if a network asset, corresponding to the index, is to be included in an inducement bundle for a customer during time period t, and a value of 0 if the network asset, corresponding to the index, is not to be included in the inducement bundle for the customer during time period t.

Expected returns field 470 may store vectors $\rho_t$ for the Hamiltonian function representation. Risk aversion field 480 may store constant for the Hamiltonian function representation. Cost of investment field 490 may store constant b for the Hamiltonian function representation. Normalization field 495 may store constant c for the Hamiltonian function representation.

Although FIG. 4 shows exemplary components of Hamiltonian representation DB 335, in other implementations, Hamiltonian representation DB 335 may include fewer components, different components, additional components, or differently arranged components than depicted in FIG. 4.

Figure 5:
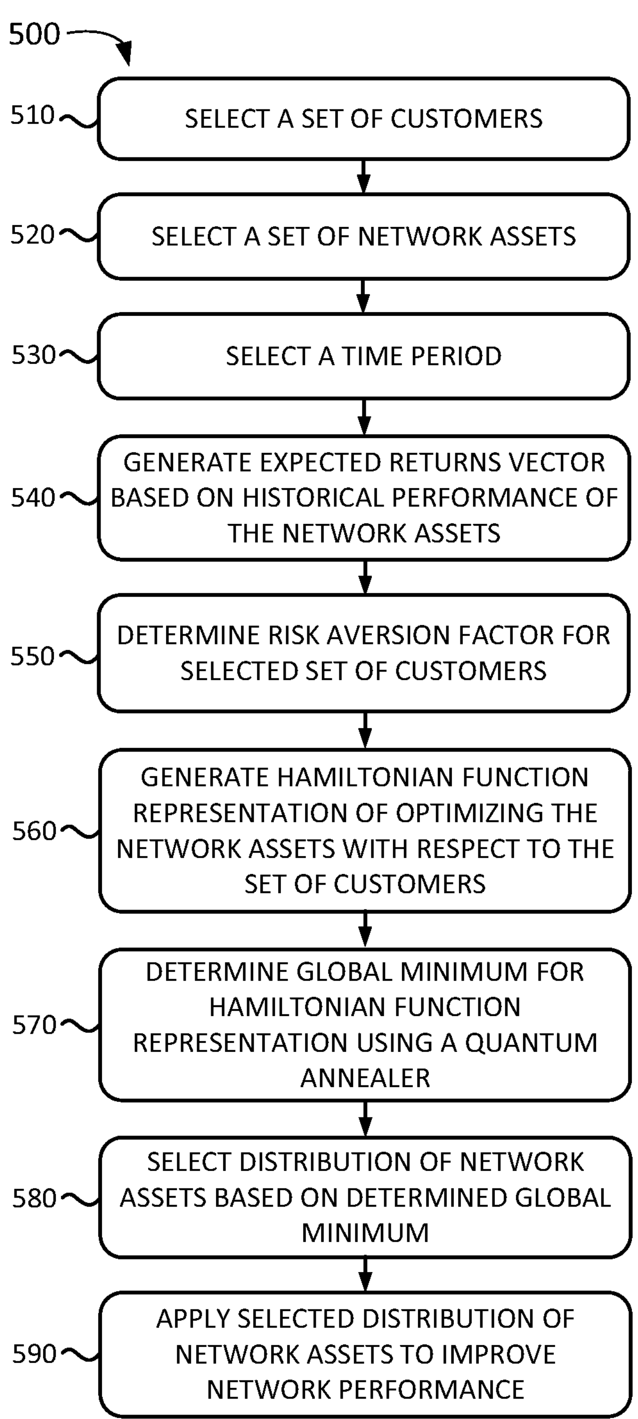
FIG. 5 is a flowchart of a process for selecting a distribution of network assets according to an implementation described herein.

FIG. 5 is a flowchart of a process 500 for selecting a distribution of network assets. In some implementations, process 500 of FIG. 5 may be performed by network assets analysis system 160. In other implementations, some or all of process 500 may be performed by another device or a group of devices.

As shown in FIG. 5, process 500 may include selecting a set of customers (block 510), selecting a set of network assets (block 520), and selecting a time period (block 530). For example, network assets analysis system 160 may receive information identifying a set of customers from customer management system 180, receive information identifying a set of network assets from network management system 170, and select a set of time events. As an example, network assets analysis system 160 may receive information identifying the set of time events from customer management system 180. Network assets analysis system 160 may generate vectors $\omega_t$ representing a series of network asset distributions over time based on the obtained information relating to the set of customers, set of network assets, and set of time events. The initial values for the elements of vectors $\omega_t$ may be selected randomly to represent an initial state of the system.

Process 500 may further include generating an expected returns vector based on the historical performance of the network assets (block 540). For example, customer management system 180 may maintain information relating to the historical performance of network assets included in inducement bundles and provide the information to network assets analysis system 160. Network assets analysis system 160 may generate vectors $\rho_t$ based on the received information. For example, if a customer did not respond to an inducement bundle that included a network asset, network assets analysis system 160 may assign a value of 0 to the index of vector Pt corresponding to the network asset with respect to the customer, and if a customer did respond to an inducement bundle that included a network asset, network assets analysis system 160 may assign a value of −1 to the index of vector $\rho_t$ corresponding to the network asset with respect to the customer.

Process 500 may further include determining a risk aversion factor for the selected set of customers (block 550). For example, for new customers, network assets analysis system 160 may select a risk aversion factor based on an inverse of an estimated value of acquiring a customer. As another example, for existing customers, network assets analysis system 160 may select a risk aversion factor based on an estimated risk of losing a customer. The estimated values or risks may be determined by customer management system 180 and provided to network assets analysis system 160.

Process 500 may further include generating a Hamiltonian function representation of optimizing the network assets with respect to the set of customers (block 560). For example, network assets analysis system 160 may prepare the energy function for a system H using Equation (1) using vectors $\rho_t$, vectors $\omega_t$, and constants a, b, and c.

Process 500 may further include determining a global minimum for the Hamiltonian function representation using a quantum annealer (block 570) and selecting a distribution of network assets based on the determined global minimum (block 580). For example, network assets analysis system 160 may provide the generated Hamiltonian function representation to quantum annealing system 190 and may receive a solution from quantum annealing system 190 that includes vectors $\omega_t$ with values corresponding to the global minimum of the Hamiltonian function. Network assets analysis system 160 may then select which network assets are to be included in inducement bundles for particular customers based on the values in vectors $\omega_t$ and provide information identifying the selected network assets to network management system 170 and/or customer management system 180.

Process 500 may further include applying the selected distribution of network assets to improve network performance (block 590). For example, network management system 170 may generate tickets to deploy, maintain, upgrade, repair, replace and/or otherwise service network assets associated with RAN 120, MEC network 132, CPE network 140, and/or core network 150. If a customer, or at least a threshold number of customers, respond to an inducement bundle that includes a particular network asset, network management system 170 may activate a service ticket associated with the particular network asset. Processing the service ticket may result in an efficient improvement in the functioning of RAN 120, MEC network 132, CPE network 140, and/or core network 150.

Figure 6:
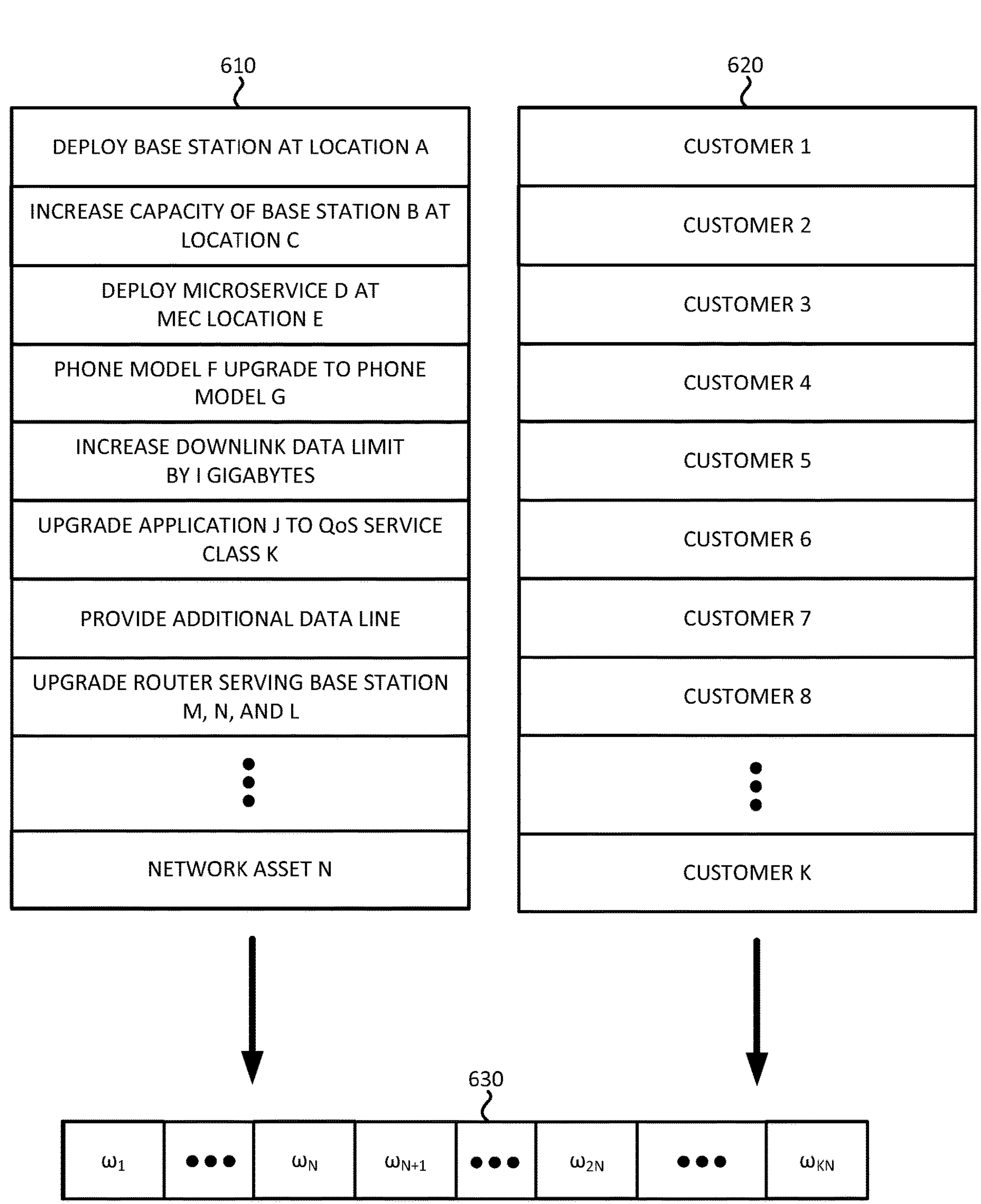
FIG. 6 is a diagram of an exemplary set of inputs for determining a distribution of network assets according to an implementation described herein.

FIG. 6 is a diagram of an exemplary set of inputs 600 for determining a distribution of network assets. As shown in FIG. 6, set of inputs 600 may include a list of a set of network assets 610 and a list of a set of customers 620. Set of network assets 610 may include, for example, network assets that include deploying a base station at location A, increasing the capacity of base station B at location C, deploying a microservice D at MEC location E, offering phone model F upgrade to phone model G, increasing the downlink data limit by I gigabytes, upgrading application J to QoS class K, providing an additional data line, upgrading a router serving base stations M, N, and L, etc. Set of customers 620 may include customers 1 to K of a provider that manager RAN 120, MEC networks 132, CPE network 140, and/or core network 150. Network assets analysis system 160 may combine set of network assets 610 and set of customers 620 into vectors $\omega_t$ 630. For example, vectors $\omega_t$ 630 may include elements $\omega_1$ to $\omega_N$ for network assets 1 to N with respect to customer 1, elements $\omega_{N+1}$ to $\omega_{2N}$ for network assets 1 to N with respect to customer 2, . . . etc., to elements $\omega_{N(K-1)}$ to $\omega_{KN}$ for network assets 1 to N with respect to customer K.

Figure 7:
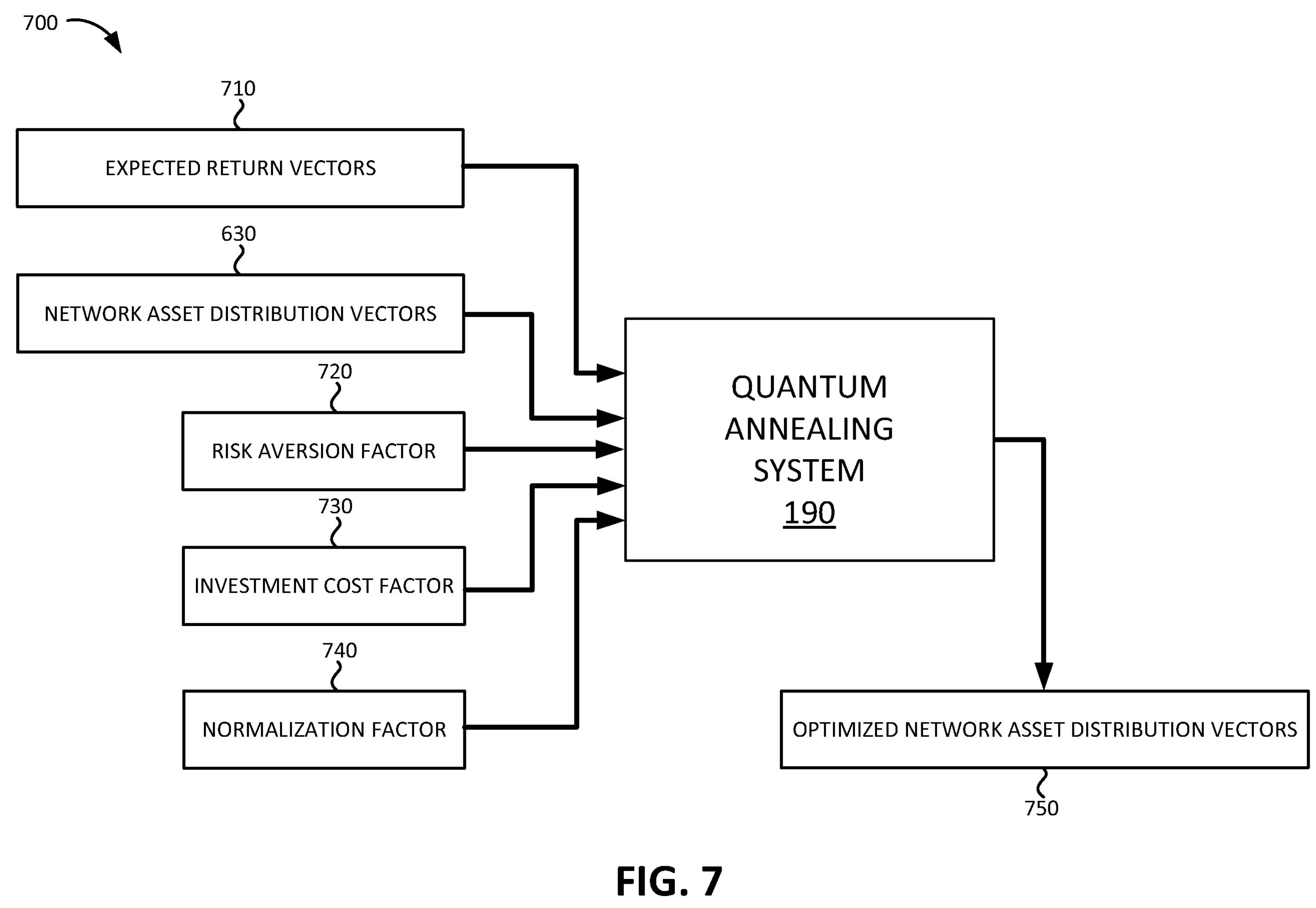
FIG. 7 is a diagram of an exemplary determination of a distribution of network assets according to an implementation described herein.

FIG. 7 is a diagram of an exemplary determination 700 of a distribution of network assets. As shown in FIG. 7, determination 700 of a distribution of network assets may include quantum annealing system 190 taking as inputs a set of expected return vectors $\rho_t$ 710, a set of network asset distribution vectors $\omega_t$ 630, risk aversion factor 720, investment cost factor 730, and normalization factor 740. Quantum annealing system 190 may determine the values of network asset distribution vectors $\omega_t$ 630 that correspond to a global minimum of the Hamiltonian function representation as optimized network asset distribution vectors $\omega_t$ 750.

Figure 8:
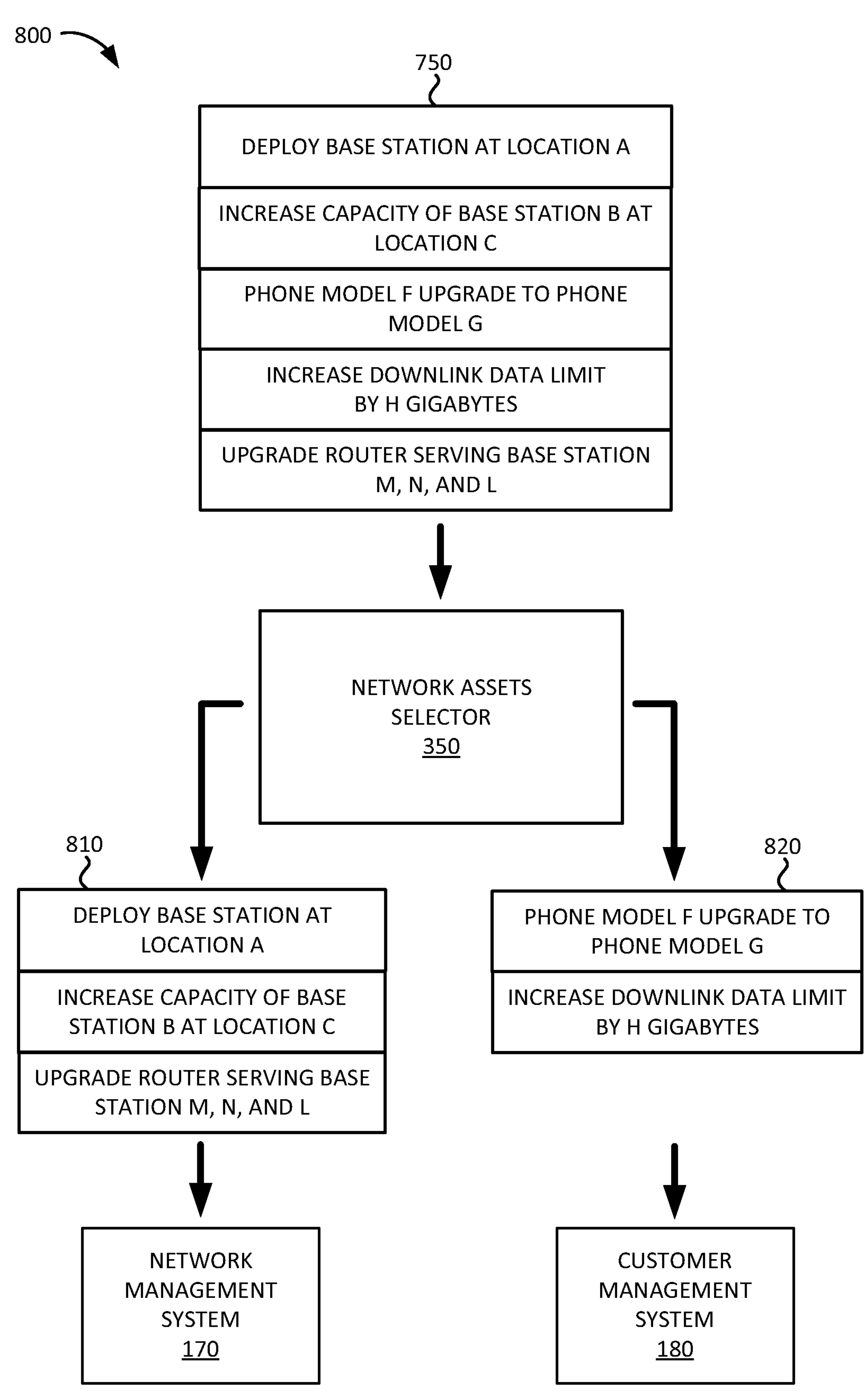
FIG. 8 is a diagram of an exemplary application of a determined distribution of network assets according to an implementation described herein.

FIG. 8 is a diagram of an exemplary application 800 of a determined distribution of network assets. As shown in FIG. 8, application 800 of the determined distribution of network assets my include optimized network asset distribution vectors $\omega_t$ 750 as input into network assets selector 350. Network assets selector 550 may select a set 810 of network assets to be provided to network management system 170, such as a set that includes, for example, deployment of a base station at location A, increasing the capacity of base station B at location C, and upgrading a router serving base stations M, N, and L. Furthermore, network assets selector may select a set 820 of network assets to be provided to customer management system 180, such as offering to upgrade phone mode F to phone model G and increasing the downlink data limit by H gigabytes.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

selecting, by a computer device, a plurality of customers;

selecting, by the computer device, a plurality of network assets;

generating, by the computer device, a Hamiltonian function representation of optimizing the plurality of network assets with respect to the plurality of customers, wherein the plurality of customers correspond to users of at least some of the network assets;

determining, by the computer device, a global minimum for the Hamiltonian function representation using a quantum annealer;

selecting, by the computer device, a distribution of the plurality of network assets based on the determined global minimum of the Hamiltonian function representation, wherein the distribution of the plurality of network assets includes an inducement bundle of at least one of products or services for the plurality of customers, wherein the inducement bundle includes an offer to provide a plurality of network assets to a customer, of the plurality of customers; and applying, by the computer device, the selected distribution of the plurality of network assets to improve network performance, wherein applying the selected distribution of the plurality of network assets to improve network performance includes at least one of installing a new network device, upgrading an existing network device, or adding capacity to the existing network device.

2. The method of claim 1, wherein generating the Hamiltonian function representation of optimizing the plurality of network assets with respect to the plurality of customers includes:

selecting a plurality of time events during a time period associated with the plurality of network assets; and generating a plurality of vectors for a distribution of the plurality of network assets based on the plurality of time events; and wherein determining the global minimum for the Hamiltonian function representation using the quantum annealer includes:

solving a Hamiltonian function corresponding to the Hamiltonian function representation to determine values associated with the generated plurality of vectors.

3. The method of claim 1, wherein generating the Hamiltonian function representation of optimizing the plurality of network assets with respect to the plurality of customers includes:

generating an expected returns vector based on a historical performance for particular ones of the plurality of network assets; and using the generated expected returns vector as a parameter in the Hamiltonian function representation.

4. The method of claim 1, wherein generating the Hamiltonian function representation of optimizing the plurality of network assets with respect to the plurality of customers includes:

determining a cost of investment for the plurality of network assets; and using the determined cost of investment as a constant in the Hamiltonian function representation.

5. The method of claim 1, wherein generating the Hamiltonian function representation of optimizing the plurality of network assets with respect to the plurality of customers includes:

determining risk aversion factors for particular ones of the plurality of customers; and using the determined risk aversion factors as a constant in the Hamiltonian function representation.

6. The method of claim 5, wherein the risk aversion factors include an inverse of an estimated value of acquiring a customer of the plurality of customers.

7. The method of claim 5, wherein the risk aversion factors include an estimated risk of losing a customer of the plurality of customers.

8. The method of claim 1, wherein adding capacity to the existing network device includes at least one of:

adding capacity to a network link associated with the existing network device, or improving service coverage associated with the existing network device.

9. The method of claim 1, wherein the plurality of network assets includes at least one of:

a base station, a fixed wireless access device, an optical terminal, a WiFi access point, a router, or a Multi-Access Edge Computing (MEC) device.

10. The method of claim 1, wherein the inducement bundle includes a list of network assets offered to the customer if the customer starts, continues, or upgrades a subscription for wireless communication services.

11. A device comprising:

a processor configured to:

select a plurality of customers;

select a plurality of network assets;

generate a Hamiltonian function representation of optimizing the plurality of network assets with respect to the plurality of customers, wherein the plurality of customers correspond to users of at least some of the network assets;

determine a global minimum for the Hamiltonian function representation using a quantum annealer;

select a distribution of the plurality of network assets based on the determined global minimum of the Hamiltonian function representation, wherein the distribution of the plurality of network assets includes an inducement bundle of at least one of products or services for the plurality of customers, wherein the inducement bundle includes an offer to provide a plurality of network assets to a customer, of the plurality of customers; and apply the selected distribution of the plurality of network assets to improve network performance, wherein the processor is further configured to, when applying the selected distribution of the plurality of network assets to improve network performance, generate an instruction to at least one of install a new network device, upgrade an existing network device, or add capacity to the existing network device.

12. The device of claim 11, wherein, when generating the Hamiltonian function representation of optimizing the plurality of network assets with respect to the plurality of customers, the processor is further configured to:

select a plurality of time events during a time period associated with the plurality of network assets; and generate a plurality of vectors for a distribution of the plurality of network assets based on the plurality of time events; and wherein, when determining the global minimum for the Hamiltonian function representation using the quantum annealer, the processor is further configured to:

solve a Hamiltonian function corresponding to the Hamiltonian function representation to determine values associated with the generated plurality of vectors.

13. The device of claim 11, wherein, when generating the Hamiltonian function representation of optimizing the plurality of network assets with respect to the plurality of customers, the processor is further configured to:

generate an expected returns vector based on a historical performance for particular ones of the plurality of network assets; and use the generated expected returns vector as a parameter in the Hamiltonian function representation.

14. The device of claim 11, wherein, when generating the Hamiltonian function representation of optimizing the plurality of network assets with respect to the plurality of customers, the processor is further configured to:

determine a cost of investment for the plurality of network assets; and use the determined cost of investment as a constant in the Hamiltonian function representation.

15. The device of claim 11, wherein, when generating the Hamiltonian function representation of optimizing the plurality of network assets with respect to the plurality of customers, the processor is further configured to:

determine risk aversion factors for particular ones of the plurality of customers; and use the determined risk aversion factors as a constant in the Hamiltonian function representation.

16. The device of claim 15, wherein the risk aversion factors include an inverse of an estimated value of acquiring a customer of the plurality of customers or an estimated risk of losing the customer of the plurality of customers.

17. The device of claim 11, wherein, when adding capacity to the existing network device, the processor is configured to at least one of:

add capacity to a network link associated with the existing network device, or improve service coverage associated with the existing network device.

18. The device of claim 11, wherein the plurality of network assets includes at least one of:

a base station, a fixed wireless access device, an optical terminal, a WiFi access point, a router, or a Multi-Access Edge Computing (MEC) device.

19. The device of claim 11, wherein the inducement bundle includes a list of network assets offered to the customer if the customer starts, continues, or upgrades a subscription for wireless communication services.

20. A non-transitory computer-readable memory device storing instructions executable by a processor, the non-transitory computer-readable memory device comprising:

one or more instructions to select a plurality of customers;

one or more instructions to select a plurality of network assets;

one or more instructions to generate a Hamiltonian function representation of optimizing the plurality of network assets with respect to the plurality of customers, wherein the plurality of customers correspond to users of at least some of the network assets;

one or more instructions to determine a global minimum for the Hamiltonian function representation using a quantum annealer;

one or more instructions to select a distribution of the plurality of network assets based on the determined global minimum of the Hamiltonian function representation, wherein the distribution of the plurality of network assets includes an inducement bundle of at least one of products or services for the plurality of customers, wherein the inducement bundle includes an offer to provide a plurality of network assets to a customer, of the plurality of customers; and one or more instructions to apply the selected distribution of the plurality of network assets to improve network performance, wherein the one or more instructions to apply the selected distribution of the plurality of network assets to improve network performance further include one or more instructions to at least one of install a new network device, upgrade an existing network device, or add capacity to the existing network device.

* * * * *